B. A. ARNOLD & D. W. ANDERSON.
AGRICULTURAL TOOL.
APPLICATION FILED MAR. 12, 1915.
1,205,836.
Patented Nov. 21, 1916.
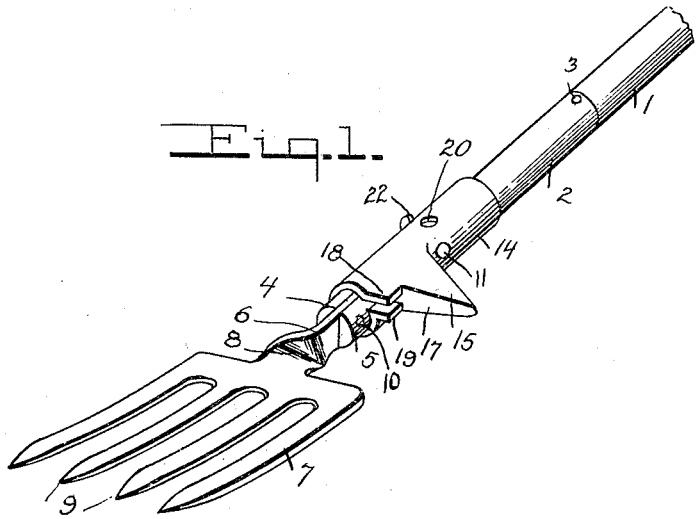
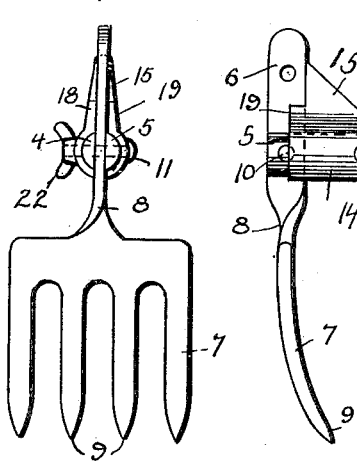
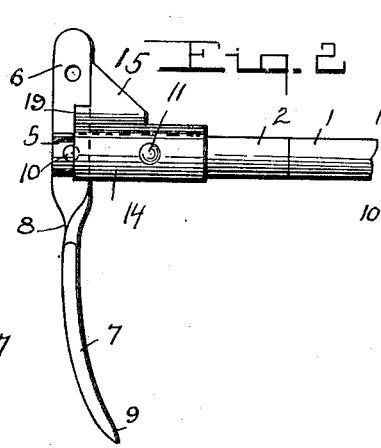
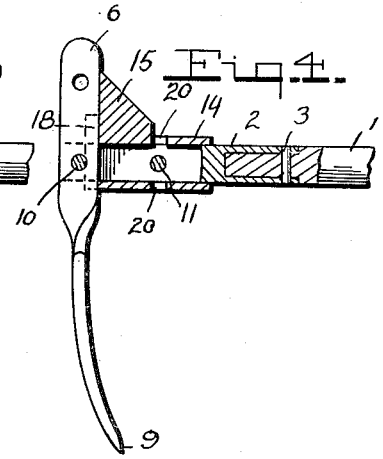
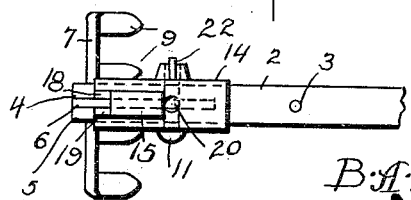

UNITED STATES PATENT OFFICE.

BRYSON A. ARNOLD AND DAVID W. ANDERSON, OF WOODRUFF, SOUTH CAROLINA.

AGRICULTURAL TOOL.

1,205,836.  Specification of Letters Patent.  Patented Nov. 21, 1916.

Application filed March 12, 1915. Serial No. 13,956.

*To all whom it may concern:*

Be it known that we, BRYSON A. ARNOLD and DAVID W. ANDERSON, citizens of the United States, residing at Woodruff, in the county of Spartanburg and State of South Carolina, have invented certain new and useful Improvements in Agricultural Tools; and we do hereby declare the following to be a full, clear, and exact description of the invention, such as will enable others skilled in the art to which it appertains to make and use the same.

This invention relates to an agricultural tool, and the primary object of the invention is to provide a tool as specified, having an operative blade pivotally connected to a handle, and to provide a support which is adjustably mounted upon the handle for preventing pivotal movement of the blade when in a substantially parallel position with the handle, and for efficiently bracing the blade when in a position transversely to the handle.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:

Figure 1 is a perspective view of the improved garden tool. Fig. 2 is a side elevation of the garden tool showing the working blade extending transversely through the handle. Fig. 3 is an end view of Fig. 2. Fig. 4 is a longitudinal sectional view through Fig. 2, and Fig. 5 is a top plan view of Fig. 2.

Referring more particularly to the drawings, 1 designates the handle of the tool, which has a ferrule 2 connected thereto as is shown at 3. The lower end of the ferrule 2 is bifurcated, forming arms 4 and 5, which have the shank 6 of the blade 7 of the tool pivotally mounted therebetween. The shank 6 is twisted as is shown at 8, for positioning the surfaces of the blade 7 at right angles to the side surfaces of the shank.

In the drawings, the blade 7 is illustrated as having a plurality of tines 9, for forming a fork, but it is to be understood that a flat solid shovel blade may be substituted in lieu of the fork blade if it is so desired, without departing from the spirit of this invention. The shank 6, and the arms 4 and 5 are provided with alining openings, positioned upwardly above the pivotal connection 10 of the shank and the arms through which a bolt 11 is inserted, for connecting the shank and the ferrule to prevent pivotal movement of the blade 7 with respect to the handle. The bolt 11 is also inserted through a sleeve 14, which is mounted upon the outer surface of the sleeve 2 and has a brace projection 15 formed thereupon, and extending transversely from the lower end of the sleeve 14. The brace projection 15 has an abrupt shoulder 17 formed upon its forward edge which is provided for abutting engagement with the rear or inner edge of the shank 6, when the blade 7 is moved to a position transversely of the longitudinal lines of the handle 1, as is illustrated in Figs. 2 and 4 of the drawings. The sleeve 14 has tangentially extending ears 18 and 19 formed thereon, forwardly of the projection 15, which are spaced from each other, and the sleeve is slit, to aline with the space between the ears, for receiving the edge of the shank 6 therein.

The sleeve 14 is provided with openings 20, extending therethrough which are positioned at substantially right angles to the openings through which the bolt 11 extends, when the blade 7 is adjusted for position substantially parallel or in alinement with the handle 1, as is shown in Fig. 1, at which time the projection 15 extends laterally of the handle 1. When it is desired to use the tool illustrated in the drawings, as a fork, the blade 7 is positioned, substantially in alinement with the handle 1, as shown in Fig. 1 of the drawings, at which time the projection 15 extends laterally of the handle 1 and the blade 7, being positioned in an unobstructive position. When it is desired to use the blade 7 as a rake, or hoe or the like, the bolt 11 is removed from insertion through the openings in the arms 4 and 5, the shank 6 and the sleeve 14, and the sleeve 14 is moved upwardly upon the exterior of the ferrule, to permit of the swinging of the shank 6 into a position transversely of the handle 1, as is clearly shown in Figs. 2, 3, 4 and 5 of the drawings. After the plate 7 and the shank 6 have been swung into the transversely extending position, the sleeve 14 is moved outwardly or downwardly upon the ferrule 2, until the inner edge of the shank 6 is seated between the ears 18 and 19, and into abutting engagement with the lower face of the bracing projection 15, at which time the bolt 11 is inserted through the openings 20, for securely holding the sleeve in position against accidental movement independent of the ferrule 2 and the handle 1. The inner edge of the shank 6 engaging the forward edge of the projection 15 will prevent pivotal movement of the blade 7, during the raking or hoeing operation of the same.

A wing nut 22 is mounted upon the bolt 11, for holding it in place.

In reducing the invention to practice certain minor features of construction, combination and arrangement of parts may necessitate alterations to which the patentee is entitled provided such alterations are comprehended within the scope of what is claimed.

What is claimed is:

An agricultural tool of the class described including a handle, a ferrule secured to said handle, having its outer end slotted, a blade, a shank carried by the blade and pivoted in the slotted end of said ferrule to permit the blade to be positioned at right angles to or parallel with the ferrule, alined openings in the slotted ferrule and the shank, a sleeve slidably and rotatably mounted upon the ferrule, said sleeve having alining slots in the upper and lower wall of its forward end, a projection formed on said sleeve and having its inner forward face in alinement with said slot, said sleeve having two pairs of openings, each pair arranged at right angles to one another, a pin passing through certain of said openings, the alined openings in the ferrule and the shank to hold the sleeve and shank of said blade in parallel position, said pin also adapted to be inserted in certain of other of said openings and the openings in the ferrule for holding the shank of the blade in a perpendicular position with relation to said sleeve, said shank when in a perpendicular position fitting in the slotted end of the sleeve and abutting the face of the projection thereby preventing movement of the same.

In testimony whereof we affix our signatures in presence of two witnesses.

BRYSON A. ARNOLD.
DAVID W. ANDERSON.

Witnesses:
E. B. STALLWORTH,
L. D. FOWLER.